United States Patent [19]
Hirtz et al.

[11] 3,788,652
[45] Jan. 29, 1974

[54] SEALING DEVICES FOR ROTATING SHAFTS

[75] Inventors: Alfred Georges Jean Hirtz, Boulogne-Sur-Seine; Christian Andre Lucien Mech, L'Isle-Adam, both of France

[73] Assignee: Societe Rateau, Paris, France

[22] Filed: Nov. 22, 1971

[21] Appl. No.: 200,983

[30] Foreign Application Priority Data
June 3, 1971 France .............................. 7120105

[52] U.S. Cl. ........................ 277/71, 277/72, 277/74
[51] Int. Cl. ............................................. F16j 15/16
[58] Field of Search ......... 277/13, 63, 3, 74, 75, 27, 277/135, 71

[56] References Cited
UNITED STATES PATENTS
| | | | |
|---|---|---|---|
| 3,410,565 | 11/1968 | Williams | 277/13 X |
| 3,408,085 | 10/1968 | Van Spijk et al. | 277/74 X |
| 3,033,579 | 5/1962 | Seaver | 277/74 X |
| 2,662,480 | 12/1953 | Clibobn | 277/74 X |
| 2,555,492 | 6/1951 | Kidney | 277/74 X |
| 1,394,959 | 10/1921 | Wilkinson | 277/13 |

FOREIGN PATENTS OR APPLICATIONS
| | | | |
|---|---|---|---|
| 891,419 | 3/1962 | Great Britain | 277/27 |

*Primary Examiner*—Samuel B. Rothberg
*Attorney, Agent, or Firm*—William J. Daniel

[57] ABSTRACT

A device for sealing an opening in a wall for the passage of a rotating shaft, comprising means for interposing a barrier of pressurized liquid between the two spaces separated by the wall. These means include an annular block sealingly mounted in the opening, astride a flange fast with the shaft, and provided, opposite each side of said flange, with a series of hydrodynamic lift generating shoes, and a frontal surface which determines a barrier-liquid leakage limiting clearance, whereby the shoes automatically balance the clearances on either side of the flange.

11 Claims, 4 Drawing Figures

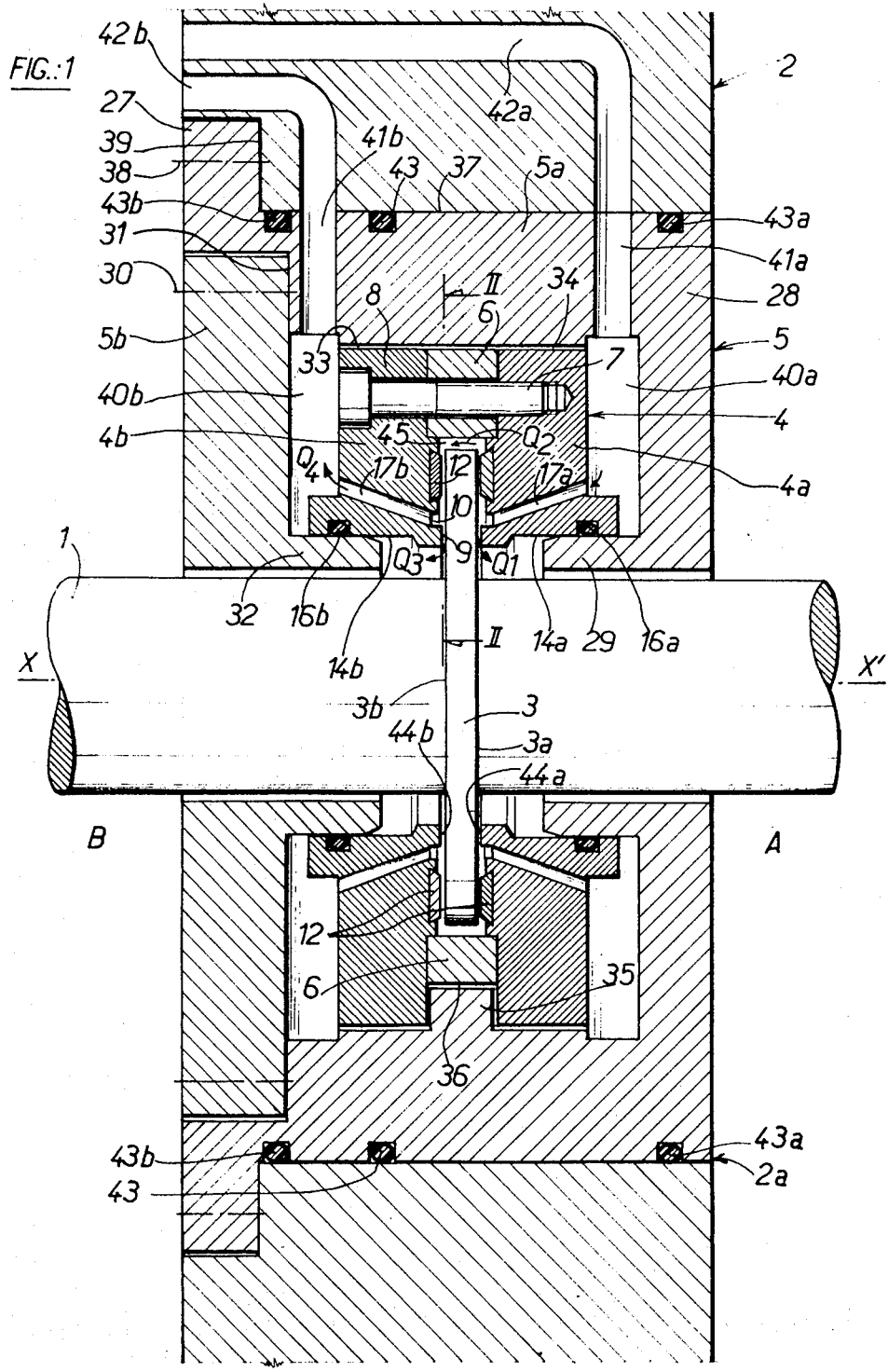
FIG.:1

SEALING DEVICES FOR ROTATING SHAFTS

This invention relates to a sealing device for a shaft rotating at high speed, as is the case especially in turbine machinery, and more particularly to a device for sealing the passageway of the shaft through a wall separating two spaces containing gases at different pressures for example. In the case of a turbine engine, a device of this kind is useful for separating an engine casing, usually containing a fluid under pressure, from the surrounding air at the point where the power-transmitting rotating shaft enters the casing.

It is already known to accomplish such sealing by interposing between the two spaces to be separated a barrier of liquid, which is at slightly greater pressure than the space in which the higher pressure prevails, and by tolerating a leakage of the barrier liquid to an extent limited by the throttling action of a small clearance between two facing surfaces fast with the wall and the rotating shaft respectively. In order to reduce to a minimum this throttling clearance and consequently the leakage of barrier fluid, while at the same time avoiding any risk of metal-to-metal contact between parts in relative motion when the shaft is rotating, it has been proposed to provide the shaft's throttling surface on one side of a flange rigid with the shaft and the other throttling surface on an annular block sealingly mounted on the wall and bearing shoes which upon rotation of the shaft cooperate with said side of the flange.

The present invention aims at maintaining a minimum throttling clearance solely through the effect of hydrodynamic forces and of providing a double liquid barrier between the two spaces.

In accordance with the invention, the sealing block is positioned astride the flange and is provided, opposite each flange face, with a frontal surface which determines a clearance capable of throttling the leaking barrier liquid, and with shoes generating hydrodynamic lift.

Preferably, the sealing block is formed by two coaxial annular elements positioned on either side of the flange and maintained in spaced relationship by a spacing member surrounding the flange.

Preferably also, the shoes are of the rocking type and move within an annular chamber fed with barrier liquid.

In one specific embodiment, the sealing block is slidably mounted within a housing enclosure fixed to the wall, and this enclosure contains barrier liquid on either side of the sealing block, the sliding motion of the block being provided through the cooperation, on either side of the flange, of cylindrical surfaces of the sealing block with cylindrical surfaces of the enclosure, O-rings being interposed therebetween.

The description which follows with reference to the accompanying non-limitative exemplary drawing will give a clear understanding of how the invention can be carried into practice, such variations as emerge either from the description or the drawing naturally falling within the scope of the invention.

In the drawing:

FIG. 1 is an axial sectional view of a sealing device according to the invention;

Figure 3:
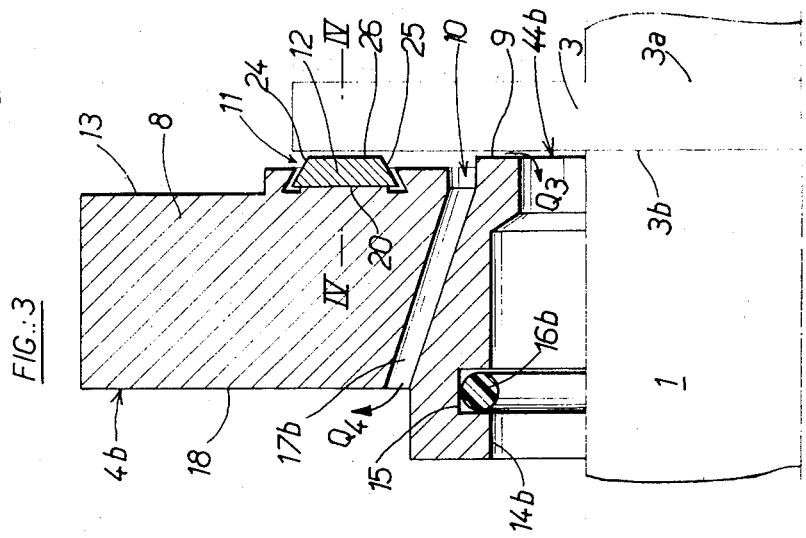
FIG. 3 is a fragmental view similar to FIG. 1, showing on an enlarged scale one of the annular elements or half-linings forming the sealing block.

FIG. 1 shows a turbine engine shaft 1 passing through a coaxial bore 2a formed through a wall 2 which separates a space A containing gas at high pressure (the interior of the engine casing, for example) from a space B containing a gas at low pressure (the atmosphere, for instance). A leaktight seal for the shaft passageway through this bore is provided by an arrangement comprising a flange 3 fast with shaft 1 and a sealing block 4 which cooperates with flange 3 and is held against angular or rotational movement but is free to slide in parallelism with the shaft axis XX', such block being disposed within an annular enclosure 5 sealingly affixed to wall 2.

The two opposite sides 3a, 3b of flange 3 are precision-surfaced and lie in planes strictly perpendicular to the axis XX' of shaft 1. Sealing block 4 comprises two half-linings 4a, 4b spaced by an annular spacer 6 and assembled by draw-bolts 7. As FIGS. 1 and 3 more clearly shows, each half-lining includes an annular body 8 the inner face of which is proximate the flange face and forms, from the interior to the exterior of the sealing block in the radial direction, a projecting lip having a precision-surfaced flat frontal surface 9 which is adapted to serve as a throttling surface, an annular groove 10, an annular dovetail keyway 11 for engagement of shoes 12, and a flat recessed surface 13 adapted to bear against the spacer 6. The interior face of each annular block 8 includes a cylindrical portion 14a (or 14b) interrupted by an annular groove 15 adapted to receive an O-ring 16a (or 16b) the purpose of which will be explained hereinafter. Passages 17a (or 17b), extend in uniform spaced angular relation from the annular groove 10 to the opposite face 18 of the body 8.

Figure 2:
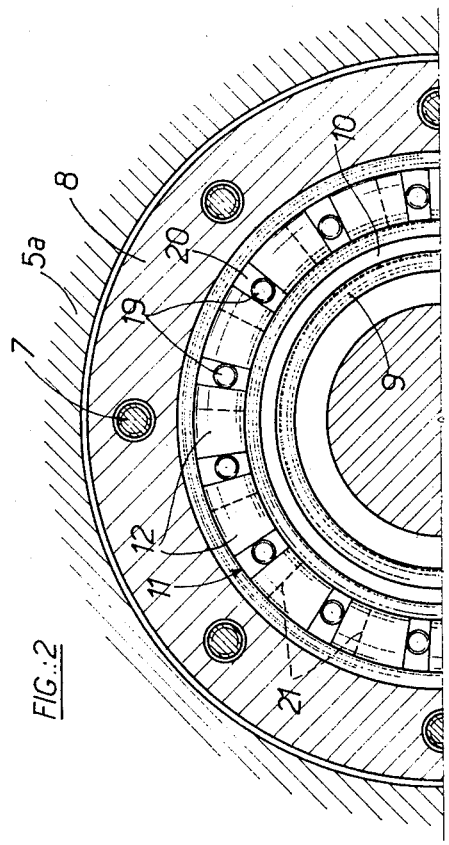
FIG. 2 is a fragmental view in section through the line II—II of FIG. 1.
Figure 4:
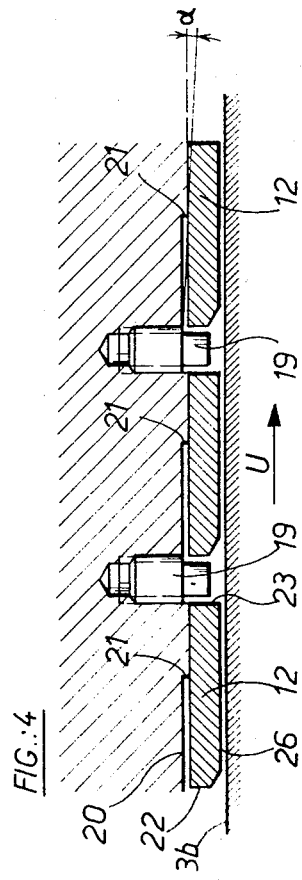
FIG. 4 is a developed fragmental sectional view along the line IV—IV of FIG. 3.

Although the body 8 is shown in the form of a single part, the dovetail keyway 11 is preferably formed of two parts to permit insertion of the shoes therein. As shown in FIGS. 2 and 4, the shoes 12 are prevented from sliding along annular keyway 11 by studs 19 screwed into the bottom 20 of the keyway, and this bottom 20 is formed with a radially-extending edge 21 about which each shoe can rock. As FIG. 4 clearly shows, if the surface 3b, say, of flange 3 is travelling at a tangential velocity $\overline{U}$ with respect to the shoes 12, the space between the flange and the body 8 being full of oil for example, then the shoes will tilt at an angle $\alpha$ by rocking on their respective associated edges 21, and each leading edge 22 will move away from the surface 3b, as is well known in the art of rocking-shoe type bearings. In order to permit this tilting action, the bottom 20 of keyway 11 is deeper between the leading edge 22 of each shoe and the edge 21 than between the latter and the trailing edge 23 of that same shoe, and a certain clearance is provided between the dovetail edges of keyway 11 and the inclined sides 24 and 25 of the shoes, as shown in FIG. 3. As this Figure further indicates, when the external face 26 of each shoe is not in its tilted position, it lies in the same plane as the throttling surface 9.

In operation, the trailing edges 23 of the rockable shoes bear against the studs 19 which prevent them from sliding. Obviously, these studs could be replaced by other convenient abutment members.

Housing 5 includes a generally cylindrically shaped collar 5a formed at one end with an external flange 27 and at the other with an annular end face 28 the inner perimeter of which carries an inwardly extending cylindrical rim 29, and an annular disk 5b is secured by screws 30 into a shoulder portion 31 of collar 5a inside flange 27, the disk 5b being bordered internally by a cylindrical rim 32 facing the rim 29 and co-extensive therewith. Sealing block 4 is positioned in the interior cavity of housing 5, with the cylindrical external surface 33 of block 4 engaged with a degree of clearance into the cylindrical internal surface 34 of collar 5a, the cylindrical internal surfaces 14a and 14b being adapted to slide over the cylindrical outer surfaces of rims 29 and 32 respectively, with two interposed plastic O-rings 16a and 16b engaged into the grooves 15. Sealing block 4 is prevented from rotating in housing 5 by a peg 35 which projects from the cylindrical inner surface 34 of collar 5a and engages into a recess 36 of spacer 6.

The cylindrical outer surface 37 of collar 5a fits in the wall bore 2a, and flange 27 is secured by screws 38, indicated schematically, into a shoulder 39 formed in said bore. The chambers 40a and 40b on either side of sealing block 4, in the interior of housing 5, communicate respectively, through passages 41a and 41b in collar 5a, with a pressurized oil feed conduit 42a and with an oil return conduit 42b passing through wall 2. Three seals 43, 43a, 43b, positioned between surface 37 and bore 2a, respectively between the oil-feed and oil-return conduits and on either side thereof, provide a barrier which prevents communication between the spaces A and B via the interstice between surface 37 and bore 2a.

The thickness of spacer 6 is chosen so as to permit adjustment as required of the total clearance between the surfaces 9 of half-linings 4a, 4b and the flange surfaces 3a, 3b. The spaces containing the shoes 12 on either side of flange 3 are filled with oil, as will be explained hereinafter, whereby, in operation, with shaft 1 and its flange 3 rotating at high speed, oppositely acting hydrodynamic forces are generated in the shoes of half-linings 4a and 4b, the effect of which is to equally distribute the total clearance referred to above as a throttling clearance 44a between surface 9 of half-lining 4a and surface 3a of flange 3, and a throttling clearance 44b between flange surface 3b and the surface 9 of half-lining 4b. This distribution of the clearances is effected with great precision because of the great resistance of the film of lubricant beneath the shoes, thereby eliminating any risk of destructive contact between the rotating flange 3 and the stationary shoes.

The oil led into chamber 40b through conduits 42a and 41a enters the groove 10 of half-lining 4a through the conduits 17a, and there divides into a leakage flow $Q_1$ that passes into the space A through the throttling clearance 44a, and a flow $Q_2$ that passes into the annular chamber 45 confined between flange 3 and sealing block 4 and limited by the clearances 44a, 44b. The flow $Q_2$ fills chamber 45, and in streaming therethrough by-passes the flange 3 and supplies the spaces containing the shoes 12 on either side thereof, eventually reaching the groove 10 of the other half-lining 4b. The oil leaving the latter groove divides once more into a leakage flow $Q_3$ towards the atmosphere via the throttling clearance 44b, and a scavenging flow $Q_4$ that streams through the passage 17b into chamber 40b and is discharged therefrom through oil return conduit 42b, via passage 41b. A valve cock (not shown) is provided in conduit 42b to adjust the rate of the scavenging flow (so-called because it serves to dissipate part of the heat generated by viscous friction in the device), whereby the barrier oil pressure is adjusted in the pressure balancing grooves 10 on either side of flange 3.

It is to be noted that the scavenging flow rate need not be very high and that, since the passageway section available to the flow $Q_2$ between the shoes is relatively large, the flow $Q_2$ sustains virtually no pressure loss, whereby the oil pressures on either side of flange 3 are substantially equal.

Notwithstanding of the fact that the annular chamber 45 limited by the throttling clearances 44a, 44b, on the one hand, and the chambers 40a and 40b limited by the O-rings 16a and 16b, on the other, impose a double oil barrier to the flow of pressure-fluid from the space A, the hydrodynamic effect obtained by the two sets of rocking shoes 12 ensures operation without any contact between parts in relative motion. Further, because it permits positioning of the sealing block in relation to the flange solely as a result of the internal forces generated by the shoes, within a preset operational clearance, the rigid assembly of the two half-linings offers the following advantages in particular:

the forces which urge the stationary throttling surfaces towards the moving throttling surfaces may cancel one another out when the system is at rest or is started up, which simplifies the choice of material for these surfaces since good frictional properties are not necessary; and it is possible to reduce the functional clearances 44a and 44b for the dual purpose of reducing the consumption of barrier liquid and increasing the resistance of the arrangement in order to enable it to withstand vibrational stress without damage.

By reason of the fact that the compressive forces applied to it act symmetrically, the flange is subjected to small stresses only, thus allowing its thickness to be notably smaller than is customary. This results in significantly reduced friction losses, which has an attendant favourable effect on the machines power balance-sheet and reduces the quantity of fluid needed to discharge frictional heat. Further, the use of a thin flange helps to dissipate the frictional heat generated in the throttling clearances.

In the embodiment shown in the drawing, the two half-linings 4a, 4b are symmetrical, so that the oil pressure in the chambers 40a, 40b and 45 acts on either side of the flange upon substantially equal areas of the sealing block, and, as indicated before, the oil pressures are substantially equal on either side of flange 3. The forces urging these throttling surfaces towards the flange are consequently virtually nil when the system is at rest or is started up, which offers the advantage already indicated above. Alternatively, the half-linings could be made asymmetrical by design so as to achieve an unbalanced effect which, when the system is at rest, would cause the sealing device to remain closed even if it were not fed with barrier liquid. This could be accomplished by causing the pressure of the barrier liquid to urge the sealing block in the same direction as the pressure in the space A in which higher pressure prevails. Referring for exemplary purposes to FIG. 1, if the diameter of the lip on half-lining 4b were decreased slightly, or if the diameter of the cylindrical surface 32 and the cooperating surface 14b were increased, then when the system is at rest the pressure of the barrier liquid would urge the lip of half-lining 4a against the flange face 3a, and, if the supply of liquid to conduit 42a were cut off, then the pressure in space A would continue to urge this lip against flange face 3a.

We claim:

1. A sealing device for sealing an opening for passage of a rotatable shaft through a wall separating two spaces, comprising a flange integral with the shaft and having first and second faces respectively facing the two spaces, a U-shaped annular sealing block sealingly mounted in said opening astride the flange, said block being held against rotation but movable axially relative to the shaft, said block having thereon first and second annular sealing surfaces respectively facing said first and second faces of the flange to define therewith first and second throttling clearances respectively, an annular plenum chamber in the block bounded by said clearances, means for feeding the plenum chamber with a barrier liquid at a pressure higher than the pressures in said spaces, first and second series of hydrodynamic lift generating shoes supported by the sealing block in cooperating relation with said first and second faces of the flange respectively, to generate oppositely directed lifting forces for controlling said clearances; a housing adapted to be sealingly secured in said wall opening, said housing enclosing an annular cavity adapted to contain the sealing block, and having two end-faces each terminating at its radially inward edge in an inwardly extending annular rim surrounding the shaft, said sealing block having cylindrical surfaces on either side of the shaft flange that are slidably mounted on corresponding rims with O-rings interposed therebetween; means for preventing rotation of the sealing block in the cavity; and means for supplying the cavity with barrier liquid on either side of the flange.

2. A sealing device according to claim 1, in which the sealing block includes two coaxial annular members on either side of the flange, and an annular spacer member surrounding the flange whereby to maintain said two coaxial members in mutually spaced relationship.

3. A sealing device according to claim 2, wherein said plenum chamber comprises an annular chamber astride the flange, limited by the two throttling clearances and containing the shoes, and means for supplying the annular chamber with barrier liquid to bathe said shoes in barrier liquid.

4. A sealing device according to claim 3, wherein the shoes are rocking shoes.

5. A sealing device according to claim 4, wherein the shoes have dovetail-like sloping sides and are loosely engaged into correspondingly dovetail-shaped annular keyways, each annular keyway having a bottom which beneath each shoe forms a radially extending associated edge to permit rocking motion of the associated shoe, including abutment means to prevent said shoes from sliding circumferentially along the annular keyways.

6. A sealing device according to claim 5, wherein the abutment means are studs screwed into the bottom of the annular keyways.

7. A sealing device according to claim 5, wherein the bottom of each keyway comprises, beneath each shoe and between said associated edge and the leading edge of the shoe, a part which is deeper than between said associated edge and the trailing edge of the shoe whereby to permit the several shoes to tilt during operation, and wherein the shoes are so dimensioned that when they are in their non-tilted position their surface which faces the corresponding flange face lies in the same plane as the sealing surface situated on the same side of the flange.

8. A sealing device according to claim 3, wherein the sealing block includes a barrier liquid inlet and outlet which open into the annular chamber between the shoes and the frontal surface, respectively on either side of the flange.

9. A sealing device according to claim 8, wherein the barrier liquid inlet and outlet open respectively into two annular grooves formed on the sealing block.

10. A sealing device according to claim 3, wherein those surfaces of the sealing block which are exposed to the barrier liquid pressure on either side of the flange have substantially equal areas.

11. A sealing device according to claim 3, wherein the two spaces comprise a space at relatively high pressure and a space at relatively low pressure and those surfaces of the sealing block which are exposed to the pressure of the barrier liquid on either side of the flange have unequal areas, whereby the pressure of the barrier liquid urges the sealing block in the same direction as the pressure in the space at relatively high pressure.

* * * * *